United States Patent [19]
Kleinschnittger et al.

[11] Patent Number: 4,784,764
[45] Date of Patent: Nov. 15, 1988

[54] ARRANGEMENT FOR THE FLOCCULATION OF FLOCCULATABLE SUBSTANCES IN SUSPENSIONS, PARTICULARLY FOR THE PURIFICATION OF THE BACKWATER OF DEINKING INSTALLATIONS FOR WASTE PAPER PROCESSING

[75] Inventors: Hans H. Kleinschnittger, Berg - Vorberg; Wolfgang Bassler, Allensbach; Albrecht Kahmann, Weingarten; Wolfgang Siewert, Ravensburg, all of Fed. Rep. of Germany

[73] Assignee: Sulzer-Escher Wyss GmbH, Ravensburg, Fed. Rep. of Germany

[21] Appl. No.: 19,241

[22] PCT Filed: Jun. 16, 1986

[86] PCT No.: PCT/EP86/00357
§ 371 Date: Feb. 19, 1987
§ 102(e) Date: Feb. 19, 1987

[87] PCT Pub. No.: WO87/00220
PCT Pub. Date: Jan. 15, 1987

[30] Foreign Application Priority Data
Jun. 24, 1985 [CH] Switzerland .................. 02 672/85-0

[51] Int. Cl.[4] .............................................. C02F 1/24
[52] U.S. Cl. ................................... 210/96.1; 210/104; 210/134; 210/199; 210/221.2; 210/520; 210/525; 209/170
[58] Field of Search .......................... 210/703-705, 210/709, 96.1, 104, 220, 221.1, 221.2, 520, 525, 928, 134, 199; 209/168-170

[56] References Cited
U.S. PATENT DOCUMENTS

| | | | |
|---|---|---|---|
| 3,307,701 | 3/1967 | Krofta | 210/221.2 |
| 3,452,869 | 7/1969 | O'Neill | 210/520 |
| 3,552,571 | 1/1971 | Neuspiel | 210/520 |
| 3,966,598 | 6/1976 | Ettelt | 210/703 |
| 4,022,696 | 5/1977 | Krofta | 210/221.2 |
| 4,173,532 | 11/1979 | Keoteklian | 210/631 |
| 4,226,714 | 10/1980 | Furness et al. | 210/104 |

FOREIGN PATENT DOCUMENTS

| | | |
|---|---|---|
| 410201 | 8/1935 | Belgium . |
| 0001418 | 4/1979 | European Pat. Off. ......... 210/221.1 |
| 697245 | 9/1940 | Fed. Rep. of Germany . |
| 1517666 | 10/1970 | Fed. Rep. of Germany . |
| 1368552 | 6/1964 | France . |
| 2224413 | 10/1974 | France . |
| 2023444 | 1/1980 | United Kingdom . |

Primary Examiner—Peter Hruskoci
Attorney, Agent, or Firm—Werner W. Kleeman

[57] ABSTRACT

An arrangement for separation by flocculation of flocculable substances contained in a suspension, as such is used particularly for purifying the backwater of deinking installations for waste paper processing, comprises a container supplied by a conduit with a suspension coming from a reservoir and admixed with flocculating agents and with air. The container contains a rotor with vertical shaft from which two arms extend outwardly at different heights. The suspension to be purified is delivered by the shaft and the upper arm, and by means of the lower situated arm leading the upper arm at an acute angle the purified water is removed. The floated-up flocculated substances are withdrawn from the surface as flotation scum and optionally by means of a conveying device through a scum conduit.

8 Claims, 3 Drawing Sheets

ARRANGEMENT FOR THE FLOCCULATION OF FLOCCULATABLE SUBSTANCES IN SUSPENSIONS, PARTICULARLY FOR THE PURIFICATION OF THE BACKWATER OF DEINKING INSTALLATIONS FOR WASTE PAPER PROCESSING

TECHNICAL FIELD

The present invention relates to an arrangement for flocculating flocculatable substances in suspensions, particularly for the purification of backwater in deinking installations for waste paper processing, wherein air and chemical agents in a quantity necessary for flocculation are fed to the suspension, the formed flocks attached to small air bubbles in a container float to the surface and are separated as flotation scum.

Such an arrangement is in particular required for the purification of the backwater of deinking installations. Such deinking installations are used for separating and removing printing inks from waste paper, so as to produce a cleaner, bright, reusable paper stock as raw material for new paper. The printing inks are separated in the foam by flotation plants and in the filtrate by washing plants. Part of the same is also located in the filtrate of any decker connected downstream. For economic reasons, the water at all these points is wholly or partly recirculated and reused again for fiberizing waste paper.

However, this backwater is contaminated with printing inks, fine fibrous materials and other substances separated from the waste paper during the deinking process. For example, the content of suspended solids can be between 500 and 3,500 mg/l. If this water were used in untreated form for fiberizing waste paper, the waste paper would be additionally contaminated. The backwater therefore must be purified.

PRIOR ART

It is known to carry out this backwater purification by adding chemicals and to flocculate and separate the foreign materials in a container, e.g. in flotation installations. In these flotation installations air is supplied and finely divided in the water. The solids transported to the surface by the air float in the container in the form of scum and can be skimmed from the clarified water using appropriate devices.

The chemicals used can be various cationic agents and/or anionic, as well as non-ionic chemicals, either individually or in combination, for example, alum can be used as a suitable, polymeric cationic agent, for example, polyacrylamide as an additional anionic polymer, for example, high polymeric polyoxy products as non-ionic agents. In order to achieve an optimum purified backwater quality, it is necessary to add each individual chemical as precisely as possible in the quantity necessary for the optimum flocculation of the foreign materials, i.e. the addition of each individual agent must neither be underdosed nor overdosed. This can be achieved by a regulating process, in that the effect is determined at appropriate points by suitable measuring instruments, e.g. turbidimeters and the addition is regulated to an optimum degree of flocculation or turbidity by means of a regulating device connected thereto through the evaluation of the measured degree of turbidity and the mass flow, on the one hand, and the quantity and concentration of the chemical addition, on the other hand. The purification effect can be further improved by successively adding several agents at different infeed points.

However, in the known flotation installations, the purification action in the flotation container, i.e. the floating of the flocculated substances attached to air bubbles and their separation from the clarified water was not of an optimum nature and therefore it was necessary to overdimension the installations to bring about an adequate efficiency per unit of time and an adequate throughput and consequently they operate relatively uneconomically.

SUMMARY OF THE INVENTION

In order to obviate the disadvantages referred to hereinbefore of the prior art, the object of the present invention is to provide an arrangement for flocculating flocculatable substances in suspensions, in particular for the purification of the backwater of deinking installations for waste paper processing, in which the flocculating action and the purification efficiency in the container are improved and an optimum value achieved, in order to permit a higher throughput and an optimum economic operation.

The inventive arrangement is characterized in that the suspension can be supplied from a reservoir via a conduit to a container, that upstream of the container there are provided addition points for the flocculing agent and the air, and that the container contains a rotor which is rotatable about a vertical shaft and has two arms extending outwards in substantially horizontal manner from the shaft, it being possible to supply by means of the shaft the suspension admixed with the flocculing agents and air to one arm located below the liquid surface or the flotation scum layer in the container and the liquid freed from the floated, flocculated substances can be removed by the other arm located above the container bottom through the shaft.

It is particularly advantageous if the arm used for supplying the suspension is at a lower depth in the container than the other arm used for removing the liquid.

In a particularly advantageous manner, the two arms are located at an acute angle to one another, and specifically such that the upper supply arm trails behind the lower removal arm during rotation, so that during each rotation of the rotor the clarified water is removed just before new suspension is fed into the container.

It is particularly appropriate to provide measuring devices in the container, which are mounted at a further, concomitantly rotating arm and which can be constructed as turbidimeters and which determine the behavior of the flocculated substances, e.g. their ascent behavior or separation and enable, by means of a regulation circuit, to control the supply of chemicals, the supply of suspension or the rotation or rotational speed of the rotor so as to achieve an optimum purification action. In addition, at various points upstream of the container, it is possible to provide further measuring devices for the optimum regulation of the supply of chemicals.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DESCRIPTION OF THE EXEMPLARY EMBODIMENTS OF THE INVENTION

Figure 1:
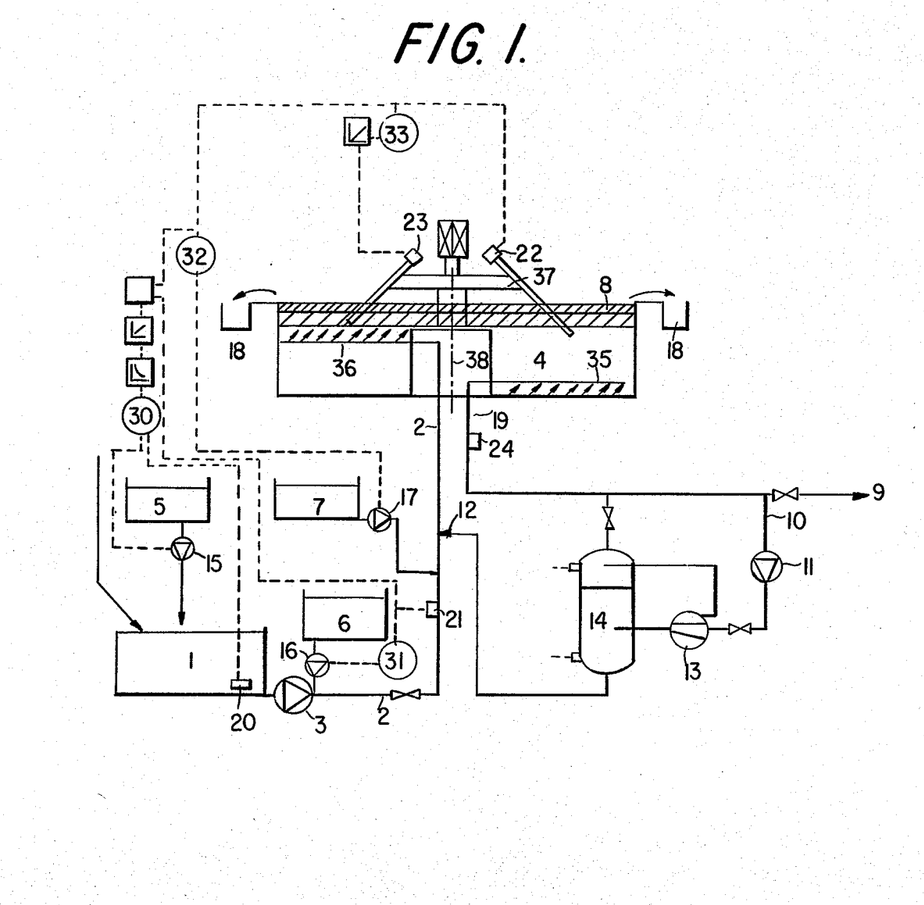
FIG. 1 is a schematic diagram of a backwater purification installation.

Describing now the drawings in the installation shown in FIG. 1 there is supplied to an untreated water reservoir 1, for example, the backwater of a deinking installation, which can contain suspended solids with a concentration of approximately 500 to 1,500 ppm. By means of a conduit 2, in which there is provided a pump 3, he reservoir 1 is connected to a container 4, into which the backwater is introduced by means of an arm 36 and the clarified water removed by a further arm 35.

By means of a controllable pump 15, the backwater in reservoir 1 is supplied with a short-chain, low molecular weight, strong cationic agent 5 for substantial charge neutralization. This agent can, for example, comprise low molecular weight, strong cationic polymers, as well as combinations of such a polymer with polyvalent metal cation compounds, for example, aluminium chloride or aluminium oxychloride. The separate addition of the metal cation compounds is also possible. When using polymers, dilution can even be eliminated in the case of adequate admixing of the backwater with the agent.

A long-chain, high molecular weight, cationic agent 6 is delivered by a pump 16 downstream of pump 3 into the conduit 2. This agent 6 leads to microflock formation in the conduit 2.

A high molecular weight, anionic agent 7 is supplied by means of a pump 17 just upstream of the purification container 4. This further agent 7 brings about a macroflock formation in the untreated water flowing into the container 4. In container 4, the flocculated, floating impurities are removed as flotation scum 8 via conduit 18 and the clarified backwater is also removed as clarified water 9 via a conduit 19. A part 10 of this clarified water is branched off by means of a pump 11 and mixed with air in a mixing apparatus 13 and then, again saturated with air, is fed at point 12 into supply conduit 2 via a saturation container 14.

For regulating the optimum addition quantity of the different agents 5, 6 and 7, a plurality of measuring devices for the characteristic properties of the backwater or the action produced by the individual chemicals, respectively, are provided and are connected to regulating devices which, in turn, control the controllable pumps 15, 16 and 17 for agent infeed.

In the untreated water reservoir 1 there is firstly provided a charge meter 20 which measures the mass charge in the suspension and by means of the regulating device 30 controls the pump 15 for supplying the first agent 5 in such a way that there is a substantial charge neutralization in the untreated water reservoir. As a result of this neutralization, it is only first possible to control the flocculation process in an optimum manner by adding further chemicals of different types.

The action of the second agent 6, which firstly brings about a microflock formation in the conduit 2, is determined by means of a further measuring device 21 in the conduit 2 at a certain distance away from the point at which the second agent is added. This measuring device 21 can, for example, be a turbidimeter, or a device for measuring the mass flow, i.e. the volume and solids content. This measuring device 21 controls by means of a regulating device 31 the controllable pump 16 for adding the second agent 6 and regulates such to an optimum value with respect to microflock formation.

In the flow direction downstream of the measuring device 21, but upstream of the container 4, the third agent 7 is fed into the conduit 2 and brings about a macroflock formation. The floating behavior of the flocculated foreign materials in the container 4 through the deposition of the air is measured by at least one further measuring device 22, which can, for example, also be constructed as a turbidimeter. This measuring device 22 is located at a certain distance from the inlet into the container 4, in order to be able to measure a change in the ascent behavior of the flocks, for example, at a point where the separation of the solids has reached a certain value, for example, at least 10%. By means of a regulation circuit 32, this measuring device 22 controls the controllable pump 17 and doses the addition of the third agent 7 in such a way that there is also an optimum setting of the clarifying action in container 4.

The container 4 can also contain a further, similarly constructed turbidimeter 23, which provides further information on the behavior of the formed flocks, for example, by observing the time behavior of the clarification. The two turbidimeters 22 and 23 can determine the turbidity at different distances from the inlet of the untreated water into the container 4 and can also determine the degree of turbidity at different levels in container 4. The regulation circuit 33 also makes it possible to dose an agent, for example, the agent 7 with the aid of the pump 17. However, instead of this, it is also possible to provide a further turbidimeter 24 in the clarified water conduit 19, whose measured value is compared in the same way with the measured value of the device 22.

Figure 2:
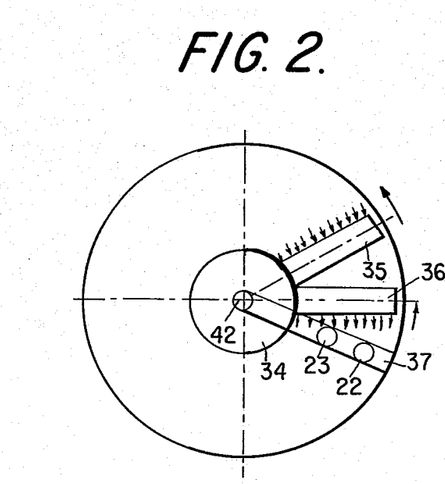
FIG. 2 illustrates in plan view of a flotation container used in the installation of FIG. 1.

Container 4 shown in the opened out state and in section in FIG. 1 and in plan view in FIG. 2 is advantageously constructed as a cylindrical trough with a diameter of several meters and in which a rotor rotates so slowly about a substantially vertical axis 38 that the clarifying action is not impaired, for example, with one revolution approximately every 15 minutes. Several horizontal arms 35, 36, 37 extend outwards from shaft 34 about the substantially vertical axis 38 and have openings distributed over their entire length from the shaft 34 to the end of each arm. The clarified water is skimmed from the container bottom or floor by the first arm 35 leading in the direction of movement, and by means of an arm 36 following at an acute angle untreated water is supplied, preferably located somewhat less deep below the liquid surface or the flotation scum layer 8. The last arm 37 carries the two turbidimeters 22 and 23, which measure the turbidity at different distances from suspension inlet arm 36 and optionally also at different depths.

As stated, these measuring devices 22, 23 make it possible to control the dosing of the addition of chemicals and optionally also via the pump 3 the quantity of suspension supplied per unit of time to the container 4 or also the rotational speed of the complete rotor about the axis 38. The purification installation can be controlled in such a way that via the arm 36 new suspension provided with flocculants and air is only supplied when the purification action at this point, i.e. the flocculation and floating of the foreign materials to be separated has advanced to such an extent that relatively clear water can be skimmed from the bottom of the container 4 by the immediately preceding or leading arm 35. At the most the supply arm 36 is located at the same depth in container 4 as the removal arm 35, but is preferably positioned less deeply therein, so that the removal arm 35 engages no floating up flocks. Thus, the purifying action and economic operation of the purification installation are of an optimum nature.

Whereas in the installation shown in FIG. 1 the removal of the flotation scum layer 8 takes place with a simple overflow conduit 18 at the edge of the container 4, floating, flocculated substances can also be removed more efficiently by additional conveying devices, such as paddle wheels, conveyor screws, blowing or suction devices, which convey the flotation scum towards a removal conduit.

Figure 3:
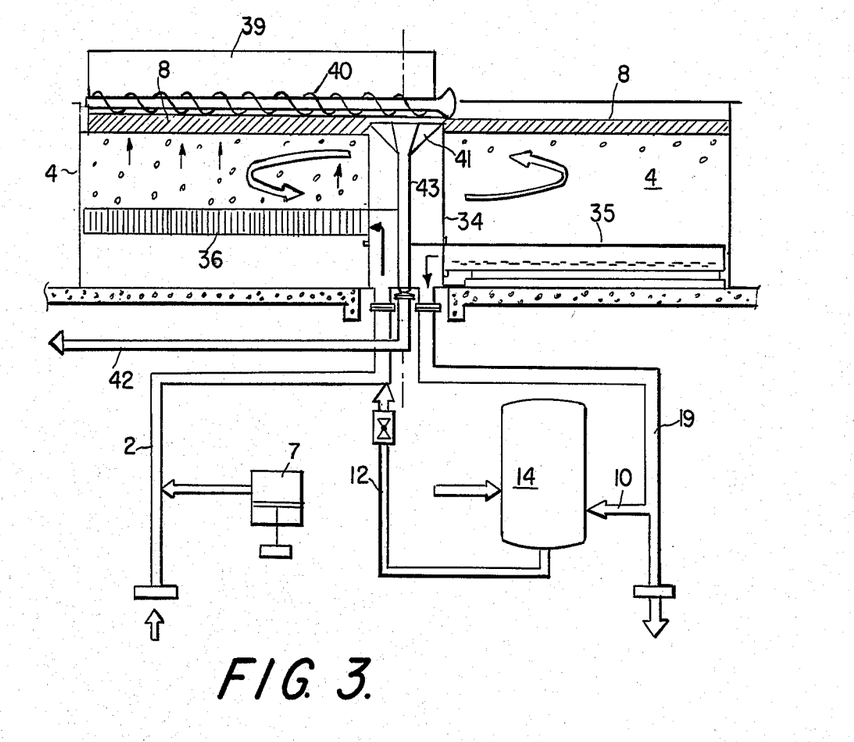
FIG. 3 is a schematic diagram of a further backwater purification installation in section.

FIG. 3 shows in section such an advantageous purification installation. The suspension mixed with flocculants 7 is supplied to the shaft 34 in the container 4 by means of a supply conduit 2 and is distributed in the higher situated trailing arm 36. The clarified water is supplied by the lower situated arm 35 via a further bore in the shaft 34 to the clarified water conduit 19. Once again, part 10 of this clarified water is saturated with air by means of a saturation container 14 and is fed via the conduit 12 into the supply conduit 2. The flotation scum layer 8 floating on the liquid surface in container 4 is, in this embodiment, transported inwards by means of a screw conveyor 40 fixed to a further, concomitantly rotating arm 39 on shaft 34 and introduced into a hopper 41 of an additional central bore 43 of the shaft 34 and is removed to the outside by means of a scum conduit 42.

Figure 4:
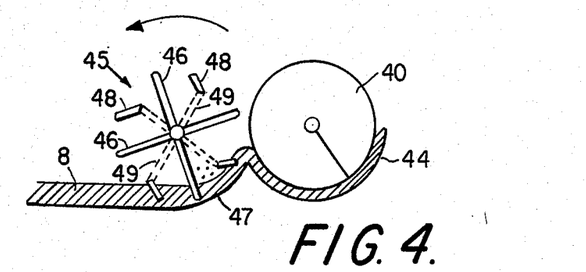
FIG. 4 illustrates a flotation scum conveying device.

FIG. 4 shows a particularly favorable construction of a conveying device, which is particularly suitable for removing relatively thick and rigid flotation scum. The screw conveyor 40 is arranged in a trough 44 in the form of a cylinder half-shell, in which the flotation scum is conveyed towards the center by means of the screw conveyor 40. The edges of this trough 44 are located above the flotation scum layer 8. To move the flotation scum into this trough 44, an impeller wheel 45 is provided parallel to the screw conveyor 40 and is provided with a plurality of flat blades 46 extending over the entire width of the arm. This impeller wheel 45 and its blades 46, respectively revolve in a guide plate 47 and raise the flotation scum layer 8 and pass it into the trough 44. In order to also be able to raise relatively rigid flotation scum layers 8, it is advantageous to provide inclined positioned vanes 48 between the blades 46 and which loosen the flotation scum. The loosened flotation scum drops through openings between the holding webs 49 of the vanes 48 onto the blades 46 and is conveyed by these into the trough 44.

Figure 5:
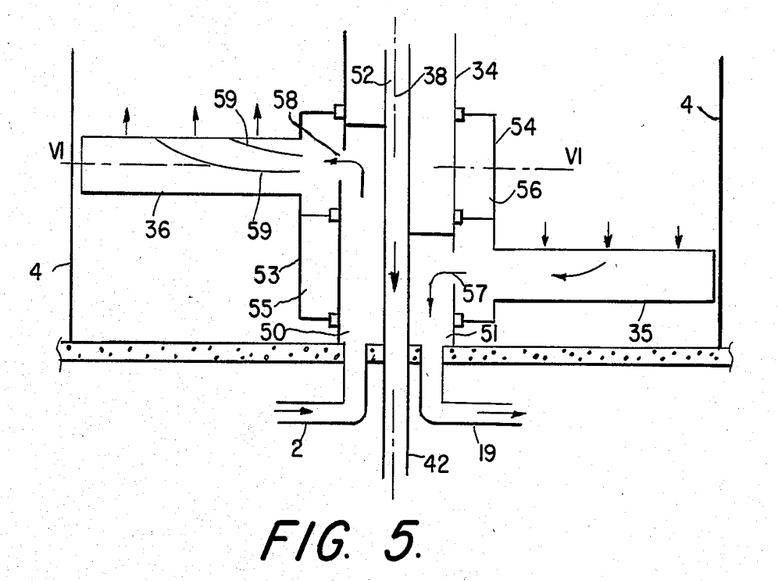
FIG. 5 illustrates a rotor with distributor arm in longitudinal section.
Figure 6:
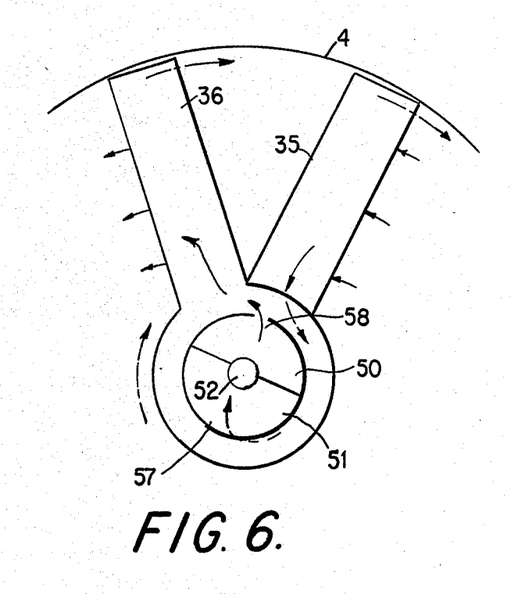
FIG. 6 is a cross-section through the rotor of FIG. 5 substantially along the section line VI—VI thereof.

FIGS. 5 and 6 depict a rotor with a shaft 34 and distributor arms 35 and 36 in longitudinal section and in cross-section. Fixed shaft 34 contains a supply duct 50 for the suspension, a removal duct 51 for the clarified water and a removal duct 52 for the skimmed flotation scum. The shaft 34 is surrounded by two sleeves or collars 53 and 54, to which are fitted the arms 35 and 36 and which revolve together with the arms 35 and 36. These sleeves 53 and 54 are sealed with respect to the shaft 34 and in each case leave an annular space 55 and 56 free, respectively, around the shaft 34 in which the clarified water can be removed by arm 35 through an opening 57 into duct 51 or the suspension can be introduced via duct 50 through an opening 58 of shaft 34 and can be distributed in arm 36. The annular spaces 55 and 56 within sleeves 53 and 54 thus permit a distribution of the liquid with respect to the arms 35 and 36 for any random angular position. In order to ensure a uniform distribution in the suspension-supply arm 36 in all positions, it is advantageous to provide suitably shaped guide surfaces or guide means 59 within this arm 36. The two sleeves 53 and 54 can be closely juxtaposed or combined into a mechanical unit, so that the clarified water-removal arm 35 is disposed somewhat lower than the suspension-supply arm 36 and consequently takes up no flocculated and generally rising foreign materials. This leads to a particularly good efficiency and economic operation of the purification installation. While there are shown and described present preferred embodiments of the invention, it is to be distinctly understood that the invention is not limited thereto, but may be otherwise variously embodied and practiced within the scope of the following claims. ACCORDINGLY, What is claimed is:

1. An arrangement for the flocculation of flocculatable substances in suspension, particularly for the purification of backwater of deinking installations for waste paper processing, comprising:
a reservoir for the delivery of a suspension;
a container having a bottom;
conduit means for supplying the suspension from the reservoir to the container in a predeterminate direction of movement;
means for supplying chemical agents to the suspension in a quantity adequate for flocculation of the suspension;
means for supplying air to the suspension;
said means for supplying chemical agents and said means for supplying air being arranged upstream of the container with respect to said predeterminate direction of movement of the suspension;
rotatable rotor means arranged within said container;
a shaft defining a substantially vertical axis of rotation provided for said rotatable rotor means;
said rottable rotor means arranged within said container rotating about said substantially vertical axis of rotation defined by said shaft;
said rotatable rotor means comprising at least two arm members;
each of said arm members extending substantially horizontally and radially outwardly from said shaft;
said shaft being structured to supply the suspension admixed with the chemical agents and air to one of said arm members for infeeding the suspension admixed with the chemical agents and air into the container;
said one arm member being situated below a liquid surface of the suspension within the container;
said other arm member removing from the container liquid substantially freed from floating flocculated substances of the suspension by means of said shaft;
said shaft defining means for supplying the suspension admixed with the chemical agents and air to said one arm member and for the outfeed of the liquid substantially freed from floating flocculated substances by said other arm member;

said other arm member being arranged above the bottom of the container;

said two arm members being arranged at different heights in said container such that said one arm member for supplying the suspension is positioned at a higher location than the other arm member for removing the liquid substantially freed from floating flocculated substances of the suspension and constituting clarified water;

each of said arm members having a free end and a predeterminate length between the shaft and the free end of each such arm member;

each of said arm members being provided with openings along the predetermined length of the arm members;

the two arm members being located at an acute angle with respect to one another;

said one arm member defining an upper arm member and said other arm member defining a lower arm member;

said upper arm memberfor infeeding the suspension, during rotation of the rotatable rotor means, trailing the lower arm member for removing the clarified water;

at least one measuring device for measuring a predeterminate characteristic of the flocculated substances in the container;

a removal conduit located substantially centrally of said shaft for removal of flotation scum formed by the floating flocculated substances;

conveying means for conveying the flotation scum to the substantially centrally located removal conduit;

an additional radially directed arm member provided for said rotatable rotor means;

said conveying means comprising a conveyor device arranged at said additional radially directed arm member;

a radially directed trough;

said conveyor device being arranged in said radially directed trough;

an impeller wheel disposed substantially parallel to the conveyor device; and said impeller wheel including blade means for conveying the flotation scum into the trough for removal by the conveyor device and infeed thereof to the centrally located removal circuit.

2. The arrangement as defined in claim 1, wherein: said at least one measuring device comprises at least two measuring devices for measuring a respective predeterminate characteristic of the flocculated substances at different heights in the container.

3. The arrangement as defined in claim 2, wherein: said measuring devices comprise turbidimeters.

4. The arrangement as defined in claim 2, further including:
a regulation circuit connected to said measuring devices for controlling the supply of flocculating agent.

5. The arrangement as defined in claim 4, wherein: said regulation circuit being structured to control the quantity of suspension supplied per unit of time by means of the conduit.

6. The arrangement as defined in claim 1, wherein: said substantially centrally located removal conduit is structured to provide and essentially unobstructed flow path for the flotation scum to enable removable removal of relatively thick flotation scum.

7. The arrangement as defined in claim 1, wherein: said shaft defines a fixed shaft;

rotatable sleeve means sealingly surrounding said fixed shaft in spaced relationship therefrom to form an annular space arond the shaft;

said arm members being mounted at said rotatable sleeve means;

each of said arm members having an internal space;

supply duct means for supplying the suspension admixed with the chemical agents and the air;

removal duct means for the removal of the liquid substantially freed from floating flocculated substances of the suspension;

said shaft being provided with separate opening means at the region of said rotatable sleeve means with which respectively flow communicate said supply duct means and said removal duct means; and said supply duct means and said removal duct means respectively flow communicating by means of said annular space with said internal spaces of the arm members.

8. An arrangement for the flocculation of flocculatable substances in suspension, particularly for the purification of backwater of deinking installations for waste paper processing, comprising:
a resrvoir for the delivery of a suspension;
a container having a bottom;
conduit means for supplying the suspension from the reservor to the container in a predeterminate direction of movement;
means for supplying chemical agents to the suspension in a quantity adequate for flocculation of the suspension;
means for supplying air to the suspension;
said means for supplying chemical agents and said means for supplying air being arranged upstream of the container with respect to said predeterminate direction of movement of the suspension;
rotatable rotor means arranged within said container;
a shaft defining a substantially vertical axis of rotation provided for said rotatable rotor means;
said rotatable rotor means arranged within said container rotating about saids substantially vertical axis of rotation defined by said shaft;
said rotatable rotor means comprising at least two arm members;
each of said arm members extending substantially horizontally and radially outwardly from said shaft;
said shaft being structured to supply the suspension admixed with the chemical agents and air to one of said arm members;
said one arm member being situated below a liquid surface of the suspension within the container for infeeding the suspension admixed with the chemical agnets and air into the container;
the other arm member removing form the container liquid substantially freed from floating flocculated substances of the suspension by means of said shaft;
said other arm member being arrnaged above the bottom of the container;
said shaft defining means for supplying the suspension admixed with the chemical agents and air to said one arm member and for the outfeed of the liquid substantially freed from floating flocculated substances by said other arm member;
said shaft defining a fixed a shaft;

rotatable sleeve means sealingly surrounding said fixed shaft in spaced relationship therefrom to form an annular space around the shaft;

said arm members being mounted at said rotatable sleeve means;

each of said arm members having an internal space;

supply duct means for supplying the suspension admixed with the chemical agents and the air;

removal duct means for the removal of the liquid substantially freed from floating flocculated substances of the suspension;

said shaft being provided with separate opening means at the region of said sleeve means with which respectively flow communicate said supply duct means and said removal duct means; and said supply duct means and said removal duct means respectively flow communicating by means of said annular space with said internal spaces of the arm members.

* * * * *

UNITED STATES PATENT AND TRADEMARK OFFICE
CERTIFICATE OF CORRECTION

PATENT NO. : 4,784,764
DATED : November 15, 1988
INVENTOR(S) : HANS HERMANN KLEINSCHNITTGER et al It is certified that error appears in the above-identified patent and that said Letters Patent is hereby corrected as shown below:

Column 7, line 21, please delete "memberfor" and insert --member for--

Column 7, line 65, please delete "and" and insert --an--

Column 8, line 3, please delete "arond" and insert --around--

Column 8, line 26, please delete "resrvoir" and insert --reservoir--

Column 8, line 29, please delete "reservor" and insert --reservoir--

Column 8, line 43, please delete "saids" and insert --said--

Column 8, line 58, please delete "agnets" and insert --agents--

Column 8, line 59, please delete "form" and insert --from--

Column 8, line 62, please delete "arrnaged" and insert --arranged--

Signed and Sealed this

Eleventh Day of July, 1989

Attest:

DONALD J. QUIGG

Attesting Officer

Commissioner of Patents and Trademarks